US008351102B2

(12) United States Patent
Fukunaga

(10) Patent No.: US 8,351,102 B2
(45) Date of Patent: Jan. 8, 2013

(54) IMAGE-PROCESSING DEVICE, IMAGE-READING DEVICE, IMAGE-FORMING DEVICE, IMAGE-PROCESSING PROGRAM, AND IMAGE-PROCESSING METHOD

(75) Inventor: Masakazu Fukunaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 751 days.

(21) Appl. No.: 12/548,000

(22) Filed: Aug. 26, 2009

(65) Prior Publication Data

US 2010/0238518 A1 Sep. 23, 2010

(30) Foreign Application Priority Data

Mar. 19, 2009 (JP) ................................ 2009-068074

(51) Int. Cl.
*H04N 1/46* (2006.01)
*G06K 9/34* (2006.01)

(52) U.S. Cl. ......................... 358/538; 382/176; 382/180

(58) Field of Classification Search .................. 358/538; 345/443, 441; 382/176, 180, 224; 715/210, 715/228, 246, 247
See application file for complete search history.

(56) References Cited

U.S. PATENT DOCUMENTS 4,875,187 A * 10/1989 Smith .......................... 345/441
5,867,159 A * 2/1999 Hamada et al. ............... 345/443
6,009,196 A * 12/1999 Mahoney ...................... 382/176

FOREIGN PATENT DOCUMENTS

JP A-9-198456 7/1997
JP A-2006-178802 7/2006

* cited by examiner

*Primary Examiner* — Charlotte M Baker
(74) *Attorney, Agent, or Firm* — Oliff & Berridge, PLC

(57) ABSTRACT

An image-processing device includes: an integration unit that, if connection information has been assigned to predetermined corresponding end points of both a first image component and a second image component from among image components, integrates the adjacent image components; a calculation unit that calculates the sum of values, the values being assigned corresponding to the connection information assigned to each end point of the image components in an integrated image component that is composed of a plural image components integrated by the integration unit; and a tabular region extraction unit that, if the value calculated by the calculation unit is equal to or greater than a threshold value corresponding to the number of image components included in the integrated image component, extracts a region of the integrated image component as a tabular region.

18 Claims, 7 Drawing Sheets

IMAGE-PROCESSING DEVICE, IMAGE-READING DEVICE, IMAGE-FORMING DEVICE, IMAGE-PROCESSING PROGRAM, AND IMAGE-PROCESSING METHOD

CROSS-REFERENCE TO RELATED APPLICATIONS

This application claims priority under 35 USC 119 from a Japanese patent application No. 2009-068074 filed on Mar. 19, 2009.

BACKGROUND

1. Technical Field

The present invention relates to an image-processing device, an image-reading device, an image-forming device, an image-processing program, and an image-processing method.

2. Related Art

Document images may contain tables in which cell regions are not separated by ruled lines. For this reason, a technology for extracting table sections from a document image based on characteristics other than ruled lines is disclosed herein.

SUMMARY

According to one aspect of the invention, there is provided an image-processing device, including: a determining unit that determines image components corresponding to linked elements from an input image; an information-assigning unit that, if an adjacent end point on one side of a bounding rectangle of an adjacent second image component facing the side of the bounding rectangle of a first image component is, together with a target end point, within a predetermined range, assigns connection information to both the target end point and the adjacent end point, the target end point being defined as an end point on one side of a bounding rectangle of a first image component determined by the determining unit; an integration unit that, if the connection information has been assigned to predetermined corresponding end points of both the first image component and the second image component from among the image components determined by the determining unit, integrates the adjacent image components; a calculation unit that calculates the sum of values, the values being assigned corresponding to the connection information assigned by the information-assigning unit to each end point of the image components in an integrated image component that is composed of a plurality of image components integrated by the integration unit; and a tabular region extraction unit that, if the value calculated by the calculation unit is equal to or greater than a threshold value corresponding to the number of image components included in the integrated image component, extracts a region of the integrated image component as a tabular region.

BRIEF DESCRIPTION OF THE DRAWINGS

Exemplary embodiments of the present invention will be described in detail based on the following figures, wherein.

DETAILED DESCRIPTION

1. Configuration

Figure 1:
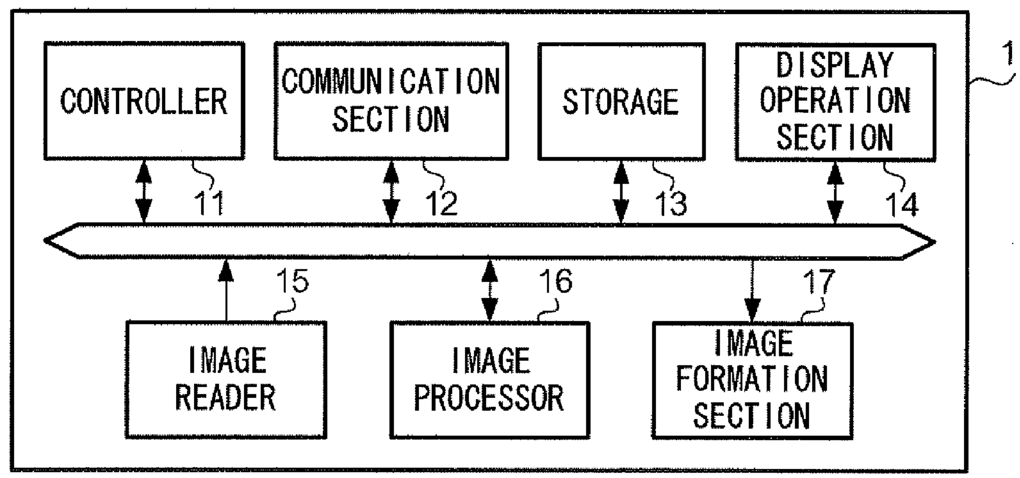
FIG. 1 is a block diagram showing a configuration of an image-forming device of an exemplary embodiment.

FIG. 1 is a block diagram showing a configuration of an image-forming device 1 of the present exemplary embodiment. As shown in FIG. 1, the image-forming device 1 includes a controller 11, a communication section 12, a storage 13, a display operation section 14, an image reader 15, an image processor 16, and an image formation section 17. The controller 11 includes a CPU (Central Processing Unit), a memory, or the like. The CPU executes a program stored in the storage 13 or another memory to allow the controller 11 to control each section of the image-forming device 1. The communication section 12 establishes communication with an external device connected through a communication line and sends and receives data. The storage 13 includes, for example, a hard disk drive that stores various types of data. The display operation section 14 is, for example, a touch screen panel that displays images corresponding to operations carried out by an operator under control of the controller 11. The image reader 15 is an example of a reading unit and is, for example, a scanner that reads a printed image and produces image data corresponding to that image. The image processor 16 implements various types of image processes according to the image data produced by the image reader 15 or according to image data received from the communication section 12. The image formation section 17 is an example of an image formation unit and is, for example, a printer that forms images via an electrophotographic system. The image formation section 17 forms and outputs images on paper according to image data processed by the image processor 16.

Figure 2:
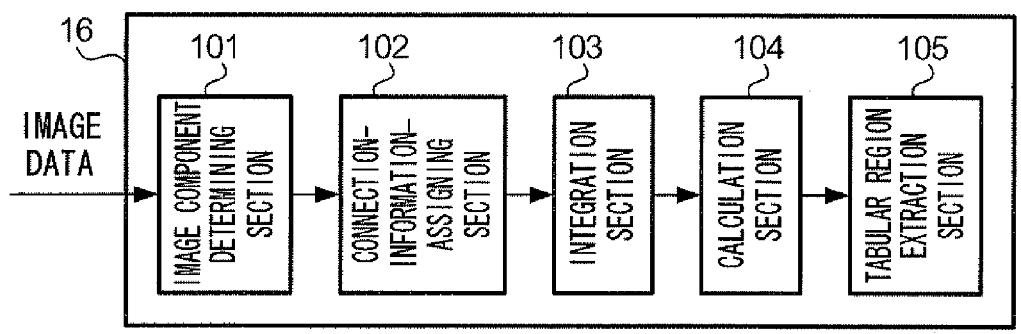
FIG. 2 is a block diagram showing a functional configuration of an image processor of the image-forming device.

FIG. 2 is a diagram showing a functional configuration of the image processor 16. As shown in FIG. 2, the image processor 16 includes an image component determining section 101, a connection information assigning section 102, an integration section 103, a calculation section 104, and a tabular region extraction section 105 as parts of its functional configuration. The image component determining section 101 determines image components corresponding to linked elements from an input image. The connection information assigning section 102 defines an end point on one side of a bounding rectangle of each image component determined by the image component determining section 101 as a target end point. If an end point of an adjacent image component that is an end point on a side facing another image components is, along with the target end point, within a predetermined range, the connection information assigning section 102 assigns connection information to both the target end point and the adjacent end point. If the connection information has been assigned to predetermined corresponding end points of two adjacent image components from among the image components determined by the image component determining section 101, the integration section 103 integrates those adjacent image components. The calculation section 104 assigns values corresponding to the connection information assigned by the connection information assigning section 102 to each end point of the image components of an integrated image component composed of multiple image components integrated by the integration section 103, and it calculates the sum of those values as a value indicating a strength of the connection between the image components of the integrated image component. If the value calculated by the calculation section 104 is equal to or greater than a threshold value corresponding to the number of image components included in the integrated image component that has been integrated by the integration section 103, the tabular region extraction section 105 extracts the region of the integrated image component as a tabular region.

2. Operation

Next, operation of the image-forming device 1 related to the present exemplary embodiment is described below. The image-forming device 1 performs a tabular region extraction process that extracts tabular regions from an image that has been read by the image reader 15.

Figure 3:
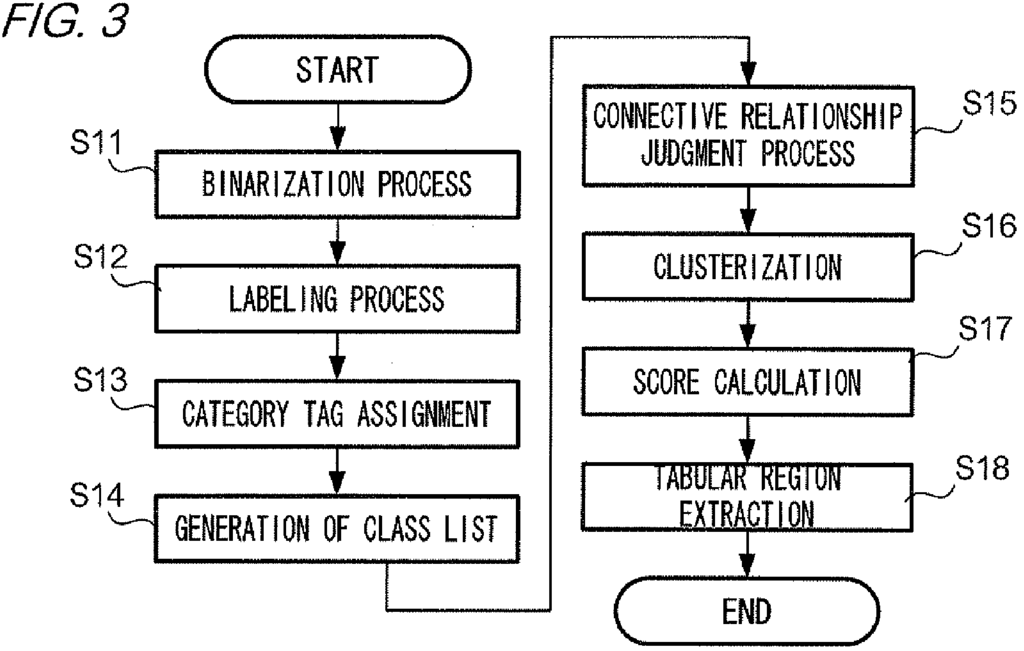
FIG. 3 is a flowchart showing a tabular region extraction process of the image-forming device.

FIG. 3 is a flowchart showing a tabular region extraction process of the image-forming device 1. When an original document image is read and image data produced by the image reader 15, the produced the image data is input into the image processor 16. When the image data is input, the image processor 16 uses this image data as an input image and performs the following processes. First, the image processor 16 performs a binarization process for the input image (step S11). Specifically, the image processor 16 turns off pixels with pixel values indicating a base color while turning on all other pixels. As a result, the input image is divided into background regions and non-background regions. Next, the image processor 16 performs a labeling process for the binary image that has undergone the binarization process (step S12). Specifically, the image processor 16 extracts each linked element included in the binary image as an object and assigns each extracted object a label number that identifies the object. These objects are image components. In addition, depending on the capability of the image reader 15 or the read conditions, there are instances in which the gap between two frame objects is collapsed and multiple frame objects are connected and resemble a single table. In such cases, the multiple frame objects are extracted as a single object.

Next, the image processor 16 assigns a category tag to each extracted object (step S13). Specifically, the image processor 16 assigns category tags based on quantitative characteristics of each object. Frame tags are assigned to objects having a frame pattern, table tags are assigned to objects having a table pattern, and character tags are assigned to objects having a character pattern. In other words, the image processor 16 determines image components corresponding to linked elements from an input image and, based on the quantitative characteristics of the linked elements, determines image components of frames or tables. Such quantitative characteristics include, for example, a size, configuration, position, density of "on" pixels, and ruled-line patterns of an object. In addition, if multiple connected frame objects are extracted as a single object as described above, a table tag is assigned to this object. In the following explanation, objects to which a frame tag has been assigned and objects to which a table tag has been assigned are referred to as "frame objects" and "table objects", respectively.

Figure 4A:
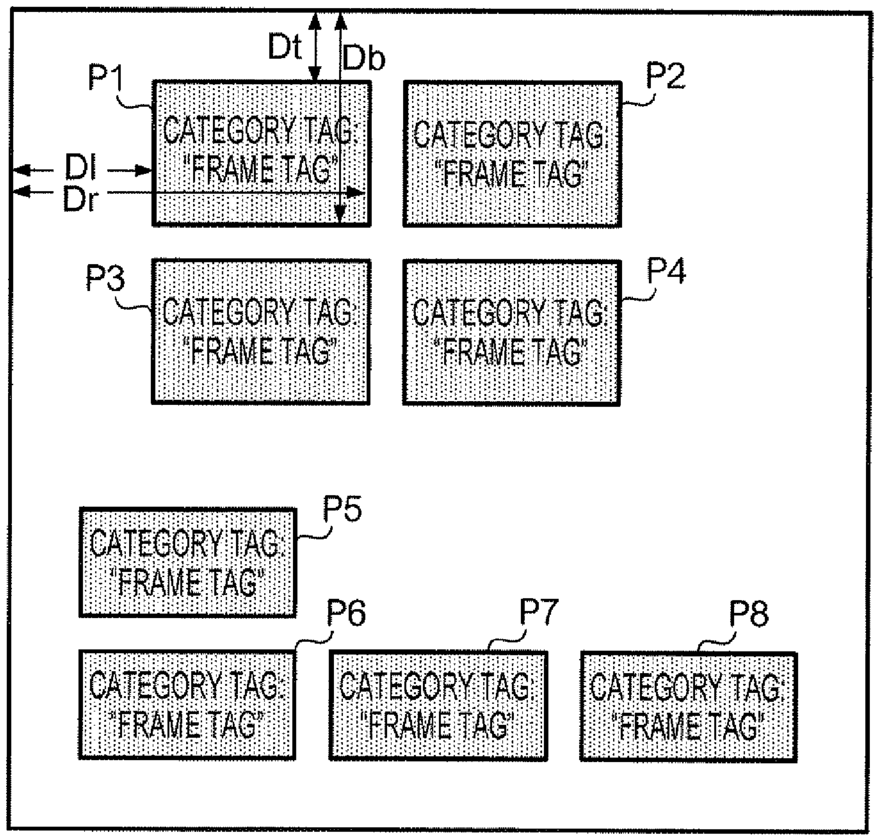
FIG. 4 is a diagram showing one example of an image used in the tabular region extraction process.

Next, the image processor 16 generates class lists for the extracted objects (step S14). These class lists describe each object's label number, category tag, cluster number, distance information indicating a distance from other objects, and other attributes. The label number and the category tag each refer to the assigned information described above. The cluster number is, for example, the same number as the label number. The distance information refers to information calculated based on the position coordinates of the objects. This distance information includes: information indicating the distances from the top and bottom sides of the bounding rectangle of each object to the bottom side of the bounding rectangle of each superior adjacent object; and information indicating the distances from the left and right sides of the bounding rectangle of each object to the right side of the bounding rectangle of each leftward adjacent object. In addition, if no objects are positioned either superiorly adjacent or leftwardly adjacent to an object, information indicating the distances to the top edge or the leftward edge of the image is used. For example, for frame object P1 shown in FIG. 4A, distance information "Dt", "Db", "Dl", and "Dr" are described in the class list.

Figure 5A:
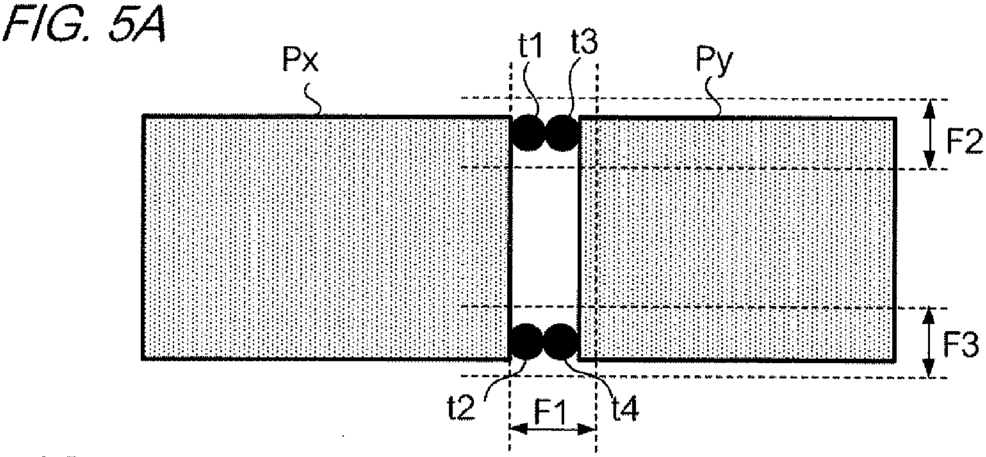
FIG. 5 is an explanatory diagram of the principles of a connective relationship judgment process performed as part of the tabular region extraction process.
Figure 5B:
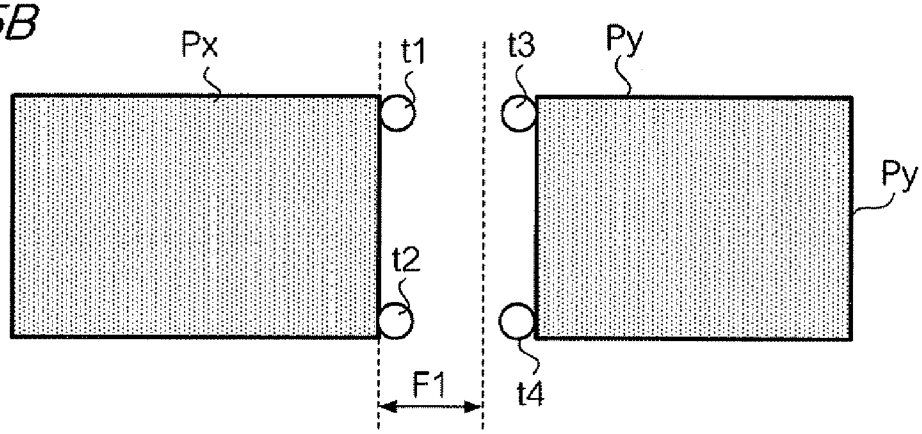
Figure 5C:
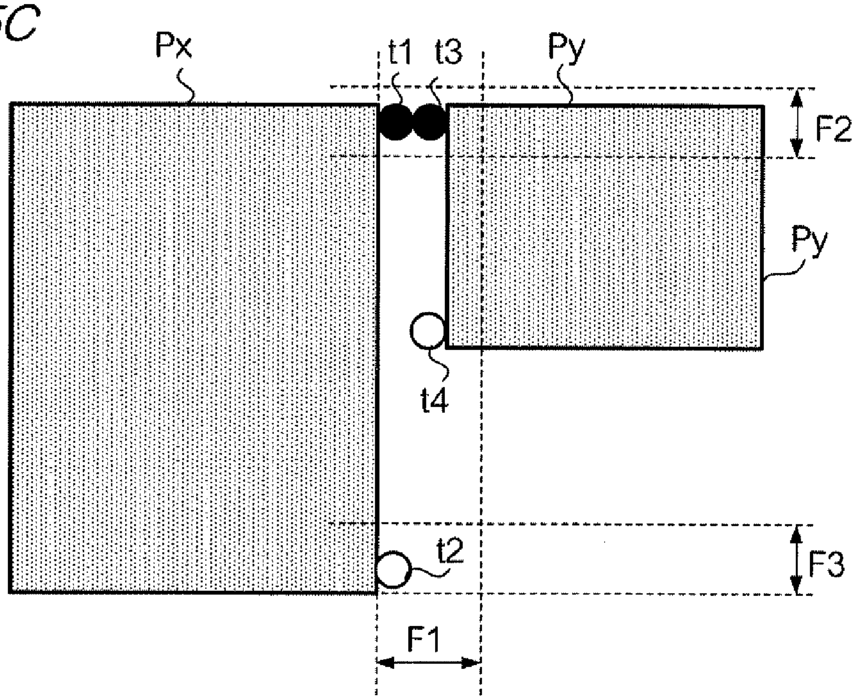

Next, the image processor 16 performs a connective relationship judgment process based on the distance information in the generated class lists (step S15). FIGS. 5A to C are explanatory diagrams of the principles of the connective relationship judgment process. In the example shown in FIG. 5A, end points t3 and t4 on the left side of object Py are positioned within range F1, the baseline of which is the right side of object Px. Moreover, end point t3 is positioned within range F2, the baseline of which is end point t1 on the right side of object Px. End point t4 is positioned within range F3, the baseline of which is end point t2 on the right side of object Px. In this case, the image processor 16 judges that there is a connective relationship between end point t1 and end point t3 as well as between end point t2 and end point t4 and assigns angular links (an example of the connection information) to end points t1 to t4. This "connective relationship" refers to a presence of a logical coupling relationship between two end points. In addition, in this diagram, end points t1 to t4, to which the angular links have been assigned, are indicated as bold circles.

Meanwhile, in the example shown in FIG. 5B, end points t3 and t4 on the left side of object Py are not positioned within range F1, the baseline of which is the right side of object Px. In this case, the image processor 16 judges that there is no connective relationship between end point t1 and end point t3 or between end point t2 and end point t4 and does not assign angular links to end points t1 to t4. In addition, in this diagram, end points t1 to t4 to which angular links have not been assigned are indicated as white circles. Moreover, in the example shown in FIG. SC, end points t3 and t4 on the left side of object Py are positioned within range F1, the baseline of which is the right side of object Px. Moreover, end point t3 is positioned within range F2, the baseline of which is end point t1 on the right side of object Px. However, end point t4 is not positioned within range F3, the baseline of which is end point t2 on the right side of object Px. In this case, the image processor 16 judges that there is a connective relationship between end point t1 and end point t3 and assigns angular links thereto, but for end point t2 and end point t4, the image processor 16 judges that there is no connective relationship and does not assign angular links.

In other words, the image processor 16 defines an end point on one side of each object as a target end point and, if an adjacent end point on an object adjacent to the first object that is an end point on one side facing that first object is, along with the target end point, within a predetermined range, assigns angular links to both the target end point and the adjacent end point. This "predetermined range" refers to, for example, the range of overlap of range F1 and range F2 or the range of overlap of range F1 and range F3 as shown in FIG. 5. In the example shown in FIG. 4A, angular links similar to those shown in FIG. 4B have been assigned to frame objects P1 to P8. In addition, as in FIG. 5, in this diagram, end points to which angular links have been assigned are indicated as bold circles while end points to which angular links have not been assigned are indicated as white circles.

Next, the image processor 16 performs clusterization based on the judged connective relationship (step S16). FIGS. 6A to D are explanatory diagrams of the principles of the clusterization. In the example shown in FIG. 6A, there is a connective relationship between end point t1 of object Px and end point t3 of object Py as well as between end point t2 of object Px and end point t4 of object Py. In this case, the image processor 16 modifies the cluster number "y" of object Py to the cluster number "x" of object Px and clusterizes object Px with object Px. In the example shown in FIG. 6B, object Px is adjacent to an object group composed of object Py and object Pz, which have the same cluster numbers. There is a connective relationship between end point t1 of object Px and end point t3 of object Py, and there is a connective relationship between end point t2 of object Px and end point t6 of object Pz. In this case, the image processor 16 modifies the cluster number "x" of object Px to the cluster number "y" of objects Py, Pz and clusterizes object Px with objects Py and Pz.

Figure 6A:
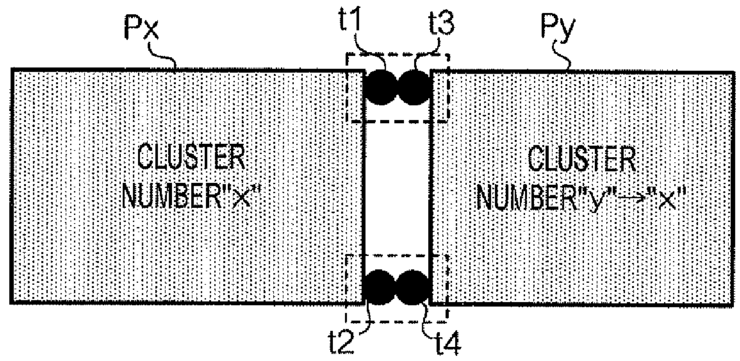
FIG. 6 is an explanatory diagram of the principles of clusterization performed as part of the tabular region extraction process.
Figure 6B:
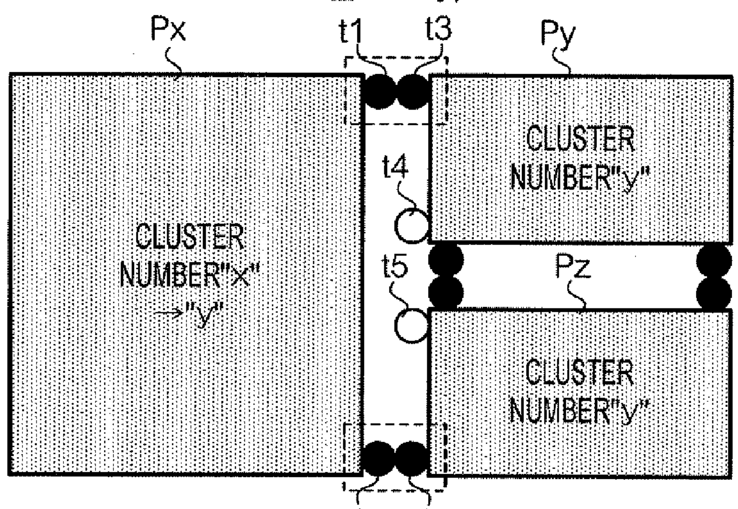
Figure 6C:
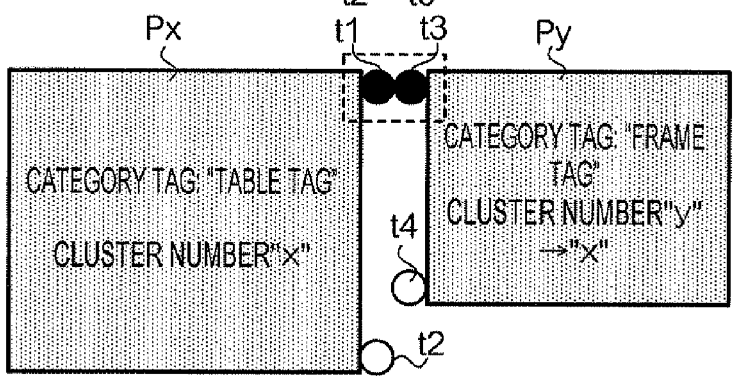
Figure 6D:
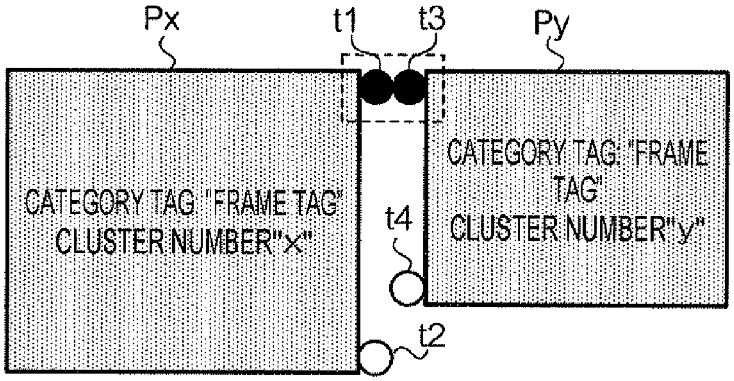

In the example shown in FIG. 6C, table object Px is adjacent to frame object Py. There is a connective relationship between end point t1 of table object Px and end point t3 of frame object Py, but there is no connective relationship between end point t2 of table object Px and end point t4 of frame object Py. Moreover, the difference in length of the mutually facing sides of table object Px and frame object Py is equal to or less than a predefined threshold value. In this case, the image processor 16 modifies the cluster number "y" of frame object Py to the cluster number "x" of table object Px and clusterizes table object Px and frame object Py. At the same time, in the example shown in FIG. 6D, frame object Px is adjacent to frame object Py. There is a connective relationship between end point t1 of frame object Px and end point t3 of frame object Py, but there is no connective relationship between end point t2 of frame object Px and end point t4 of frame object Py. In this case, the image processor 16 does not clusterize frame object Px and frame object Py.

In other words, if two adjacent objects meet any of the following cluster conditions 1 to 3, the image processor 16 modifies the cluster numbers of those objects to a single number and clusterizes the objects. This "clusterization" refers to the integration of two adjacent objects.

Cluster condition 1: Angular links have been assigned to an end point on each of the mutually facing sides of two adjacent objects.

Cluster condition 2: If a group of multiple objects with the same cluster number is adjacent to a single object, angular links have been assigned to an end point on each of the mutually facing sides of the object group and the single object.

Cluster condition 3: If a frame object is adjacent to a table object, angular links have been assigned to an end point on each of the mutually facing sides of the table object and the frame object, and furthermore, the difference in length of the facing sides is equal to or less than a predefined threshold value.

The "end point on each of the mutually facing sides of the object group and the single object" of cluster condition 2 refers to, for example in FIG. 6B, end point t1 of object Px and end point t3 of object Py, or end point t2 of object Px and end point t6 of object Py. In other words, in this case, the sides connecting the right side of object Px with the left sides of the objects Py and Pz are defined as mutually facing sides.

Figure 4B:
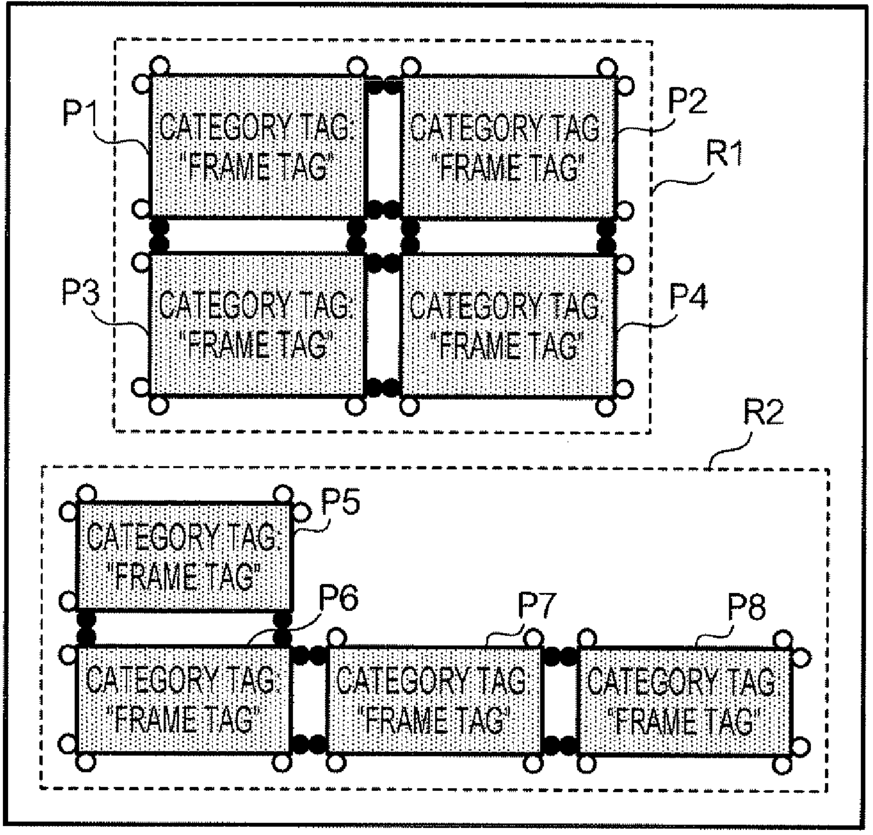

In the example shown in FIG. 4B, frame objects P1 to P4 are clusterized and become integrated object R1, while frame objects P5 to P8 are clusterized and become integrated object R2.

Next, the image processor 16 calculates a horizontal score, which indicates the strength of the connective relationships between horizontally adjacent objects, and a vertical score, which indicates the strength of the connective relationships between vertically adjacent objects, of the clusterized integrated object (step S17). Specifically, the image processor 16 calculates scores in accordance with the following calculation rules 1 to 3.

Calculation rule 1: Add 1 point for each end point to which an angular link has been assigned on mutually facing sides of two adjacent objects.

Calculation rule 2: If a frame object is adjacent to a table object, add 1 point for each end point to which an angular link has been assigned on mutually facing sides of the frame object and the table object.

Calculation rule 3: If a frame object group in which multiple frame objects are positioned is adjacent to a single object, add (the number of frame objects included in the frame object group—1) points for each end point of the single object to which an angular link has been assigned on mutually facing sides of the frame object group and the single object.

In other words, the image processor 16 assigns scores corresponding to the angular links on each end point of the objects within an integrated object and calculates the sum of the scores assigned to the end points on the mutually facing sides of objects that are adjacent in a horizontal direction, which is a first direction, as a horizontal score, which is a value indicating the strength of the horizontal connections between the objects within an integrated object. The image processor 16 calculates the sum of the scores assigned to the end points on mutually facing sides of objects that are adjacent in a vertical direction, which is a second direction different from the first direction, as a vertical score, which is a value indicating the strength of the vertical connections between the objects within an integrated object.

Integrated object R1 that is shown in FIG. 4B includes 4 frame objects P1 to P4. Within integrated object R1, there are 8 angular links indicating connective relationships between the horizontally adjacent frame objects within the diagram and 8 angular links indicating connective relationships between the vertically adjacent frame objects within the diagram. In this case, based on calculation rule 1, a horizontal score of 8 points and a vertical score of 8 points are calculated for integrated object R1. Moreover, integrated object R2 includes 4 frame objects P5-P8. Within integrated object R2, there are 8 angular links indicating connective relationships between the horizontally adjacent frame objects within the diagram and 4 angular links indicating connective relationships between the vertically adjacent frame objects within the diagram. In this case, based on calculation rule 1, a horizontal score of 8 points and a vertical score of 4 points are calculated for integrated object R2.

Next, the image processor 16 defines a total number of objects included in each of the clusterized integrated objects as N, and if the calculated scores satisfy each of the following formulae (1) to (3) when the calculated horizontal score and vertical score are defined as Sc and Sr, respectively, the image processor 16 extracts the integrated object region as a tabular region (step S18). In addition, if N is an odd number, the remainder of the division operation (N/2) in formulae (1) and (2) is rounded off.

$$Sc \geqq 4\times(N/2) \quad (1)$$

$$Sr \geqq 4\times(N/2) \quad (2)$$

$$Sc+Sr \geqq 4\times N \quad (3)$$

The operation (4×(N/2)) on the right sides of formulae (1) and (2) represents a first threshold value corresponding to the number of objects included in the integrated object. Moreover, the operation (4×N) on the right side of formula (3) represents a second threshold value corresponding to the number of objects included in the integrated object. In other words, if both the horizontal and vertical scores of the integrated object are equal to or greater than the first threshold value corresponding to the number of objects included in the integrated object, and if the sum value of the horizontal and vertical scores is equal to or greater than the second threshold value corresponding to the number of objects included in the integrated object, the image processor 16 extracts the region of the integrated object as a tabular region. In addition, if the total number of objects included in the integrated object is less than 3, the image processor 16 judges that the integrated object is not a table and does not extract the region as a tabular region.

In integrated object R1 that is shown in FIG. 4B, the total number of objects N is 4, the horizontal score Sc is 8 points, and the vertical score Sr is 8 points, and therefore, each of formulae (1) to (3) is satisfied. In this case, integrated object R1 is judged to be a table and the region thereof is extracted as a tabular region. At the same time, in integrated object R2, the total number of objects is 4, the horizontal score is 8 points, and the vertical score is 4 points, and therefore, formula (1) is satisfied but formulae (2) and (3) are not satisfied. In this case, integrated object R2 is judged not to be a table and is not extracted as a tabular region.

The score calculation and tabular region extraction is described in further detail below using several examples. In the example shown in FIG. 7A, integrated object Ra includes 8 frame objects Pa1 to Pa8. Within integrated object Ra, there are 20 angular links indicating the connective relationships between the horizontally adjacent frame objects within the diagram and 20 angular links indicating the connective relationships between the vertically adjacent frame objects within the diagram. In this case, based on calculation rule 1, a horizontal score of 20 points and a vertical score of 20 points are calculated in step S17. At this time, the calculated scores satisfy each of formulae (1) to (3). Consequently, in step S18, integrated object Ra is judged to be a table and the region thereof is extracted as a tabular region.

Figure 7A:
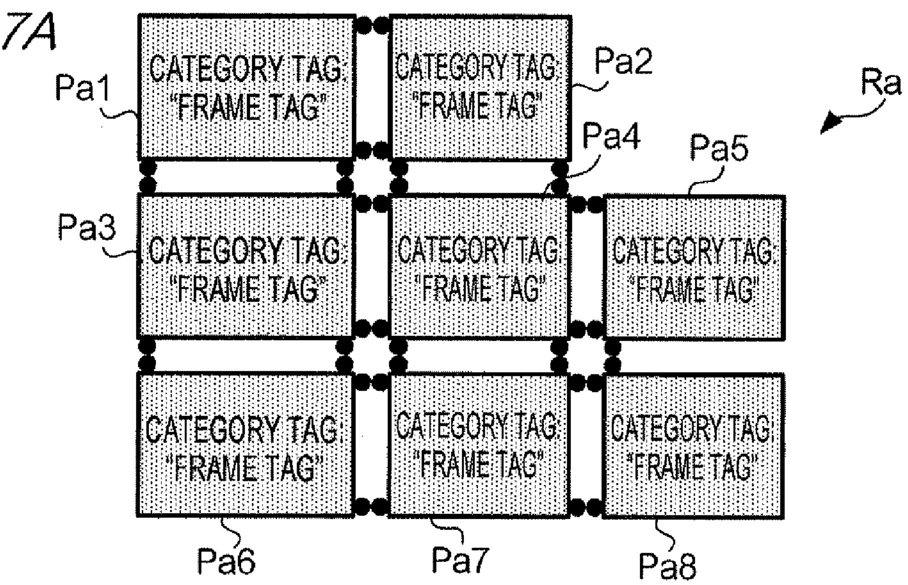
FIG. 7 is a diagram showing one example of an integrated object used in the tabular region extraction process.
Figure 7B:
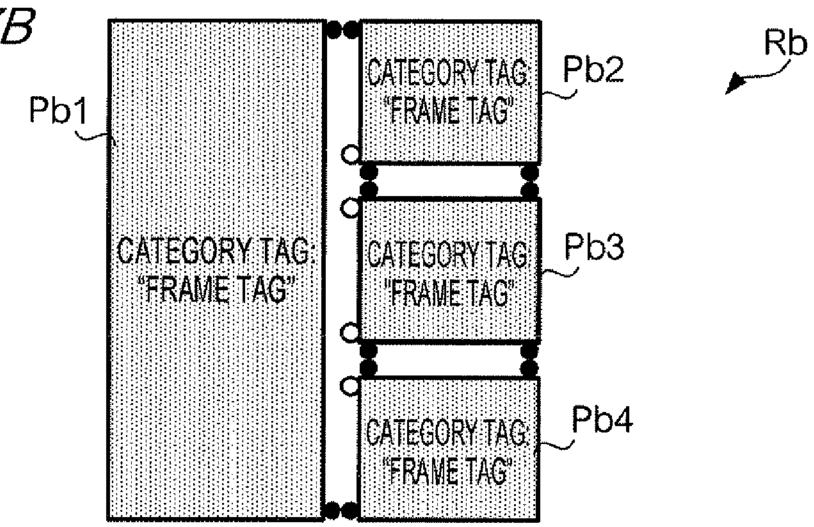

In the example shown in FIG. 7B, integrated object Rb includes 4 frame objects Pb1 to Pb4. As shown in the diagram, frame object Pb1 and a frame object group composed of frame objects Pb2 to Pb4 are positioned adjacent to each other. Within integrated object Rb, there are 4 angular links indicating the connective relationships between the horizontally adjacent frame objects within the diagram and 8 angular links indicating the connective relationships between the vertically adjacent frame objects within the diagram. In this case, based on calculation rule 1, a horizontal score of 4 points and a vertical score of 8 points are first calculated in step S17. Moreover, within integrated object Rb, there are 3 frame objects included in the frame object group as well as 2 end points on frame object Pb1 with a connective relationship between frame object Pb1 and the frame object group, and therefore, based on calculation rule 3, 4 points ((3−1)×2) are added to the horizontal score. Consequently, the horizontal score and the vertical score of integrated object Rb are 8 points and 8 points, respectively. At this time, the calculated scores satisfy each of formulae (1) to (3). Subsequently, in step S18, integrated object Rb is judged to be a table and the region thereof is extracted as a tabular region.

Figure 7C:
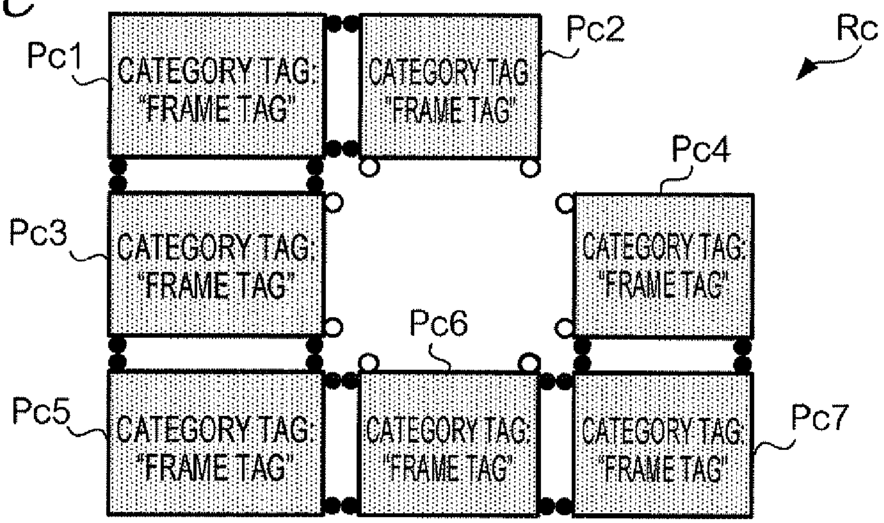

In the example shown in FIG. 7C, integrated object Rc includes 7 frame objects Pc1 to Pc7. Within integrated object Rc, there are 12 angular links indicating the connective relationships between the horizontally adjacent frame objects in the diagram and 12 angular links indicating the connective relationships between the vertically adjacent frame objects in the diagram. In this case, based on calculation rule 1, a horizontal score of 12 points and a vertical score of 12 points are calculated in step S17. At this time, the calculated scores do not satisfy any of formulae (1) to (3). Consequently, in step S18, integrated object Rc is judged not to be a table and is not extracted as a tabular region.

In this way, as demonstrated with integrated object R1 of FIG. 4B, integrated object Ra of FIG. 7A, and integrated object Rb of FIG. 7B, in the tabular region extraction process, even tables in which cell regions are not divided by ruled lines are judged as being tables and regions thereof are extracted as tabular regions. At the same time, objects such as, for example, integrated object Rc of FIG. 7C, in which there are interior spaces, or integrated object Rc of FIG. 4B, in which frame objects are positioned in a single line, are judged not to be tables and are not extracted as tabular regions.

3. MODIFIED EXAMPLES

The above description is of an exemplary embodiment, but various modifications can be made to this exemplary embodiment without departing from the intended scope of the invention, for example, as set out below. In addition In addition, each of the following modified examples can be combined in one or more ways, in an appropriate manner as desired.

3-1. Modified Example 1

In the tabular region extraction process, if images including frame objects are used within a table object, there are cases in which processes cannot be performed with high precision. Therefore, after step S13, the image processor 16 may perform a deletion process to delete the frame objects from within the table object. In other words, the image processor 16 is an example of a deletion unit that deletes frame objects in cases in which frame objects are included within a table object.

Figure 8:
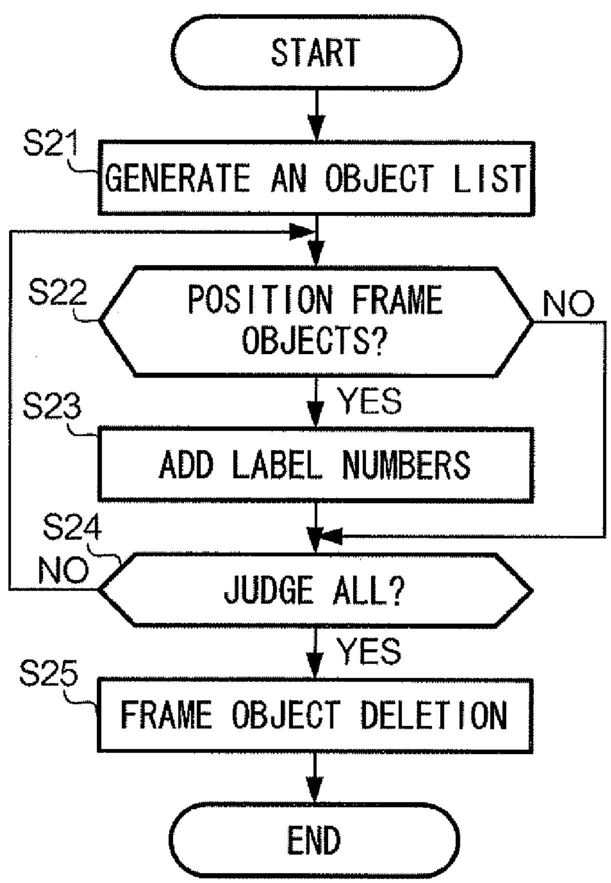
FIG. 8 is a flowchart showing a deletion process included in the modified examples.
Figure 9:
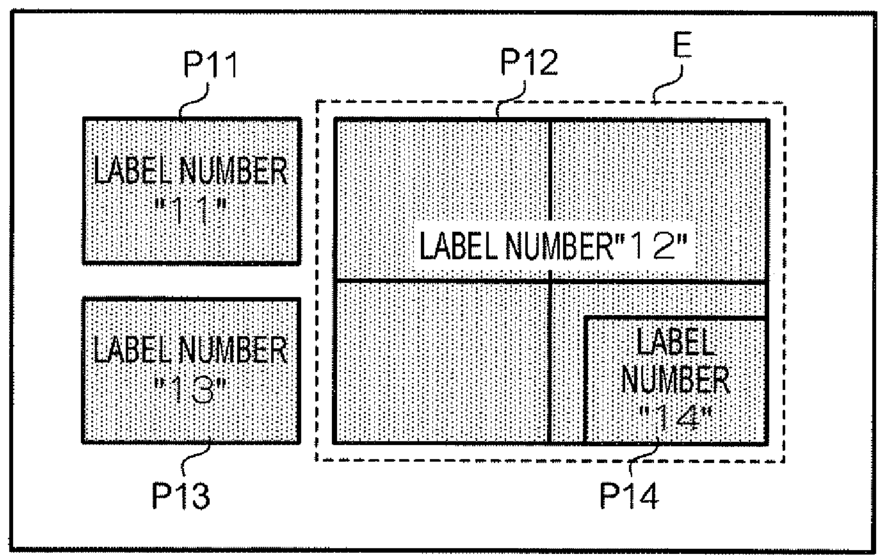
FIG. 9 is a diagram showing one example of an image used in the deletion process included in the modified examples.

FIG. 8 is a flowchart showing the deletion process. As shown in this diagram, based on the category tags assigned to each object, the image processor 16 first generates a table object list, a frame object list, and a list of the frame objects within the table (step S21). For instance, in the example shown in FIG. 9, the label number "12" of table object P12 is added to the table object list and the label numbers "11", "13", and "14" of frame objects P11, P13, and P14, respectively, are added to the frame object list. In addition, in this example, none of the objects are added to the list of frame objects within the table.

Next, the image processor 16 selects one of the table objects and judges whether any frame objects have been positioned within an expanded range of 2 pixels from the region of the selected table object (step S22). If there is a frame object positioned within the expanded range (step S22: YES), the image processor 16 adds the label number of the frame object to the list of frame objects within the table (step S23). On the other hand, if there are no frame objects positioned within the expanded range (step S22: NO), the image processor 16 proceeds to step S24 without performing the process of step S23. In the example shown in FIG. 9, the frame object P14 is positioned within expanded range E of 2 pixels from the region of table object P12, and therefore, the label number "14" of frame object P14 is added to the list of frame objects within the table.

Next, the image processor 16 determines whether the judgment of step S22 has been implemented for all of the table objects (step S24). If the judgment has not been implemented for all of the table objects (step S24: NO), the image processor 16 returns to the process of step S22, selects a table object, and performs the processes described above. On the other hand, if the above judgment has been implemented for all of the table objects (step S24: YES), the image processor 16 deletes the frame objects that have a label number included in the list of frame objects within the table (step S25) and completes the deletion process. In the example shown in FIG. 9, the label number "14" has been added to the list of frame objects within the table, and therefore, frame object P14 is deleted.

3-2. Modified Example 2

Regarding the calculation of scores, if a table object is included in an integrated object, the vertical score and horizontal score may be calculated in accordance with the following calculation rule 4.

Calculation rule 4: If a table object is included in an integrated object, "α" points and "β" points are added to the horizontal score and the vertical score, respectively.

"α" and "β" are weighted coefficients. A value equal to or greater than the horizontal score of a standard integrated object is used for "α", and a value equal to or greater than the vertical score of a standard integrated object is used for "β". The standard integrated object is an object in which i number of frame objects of identical size are positioned both vertically and horizontally. For example, the standard integrated object may be an object in which 4 frame objects of identical size are positioned in a 2×2 configuration.

Figure 10:
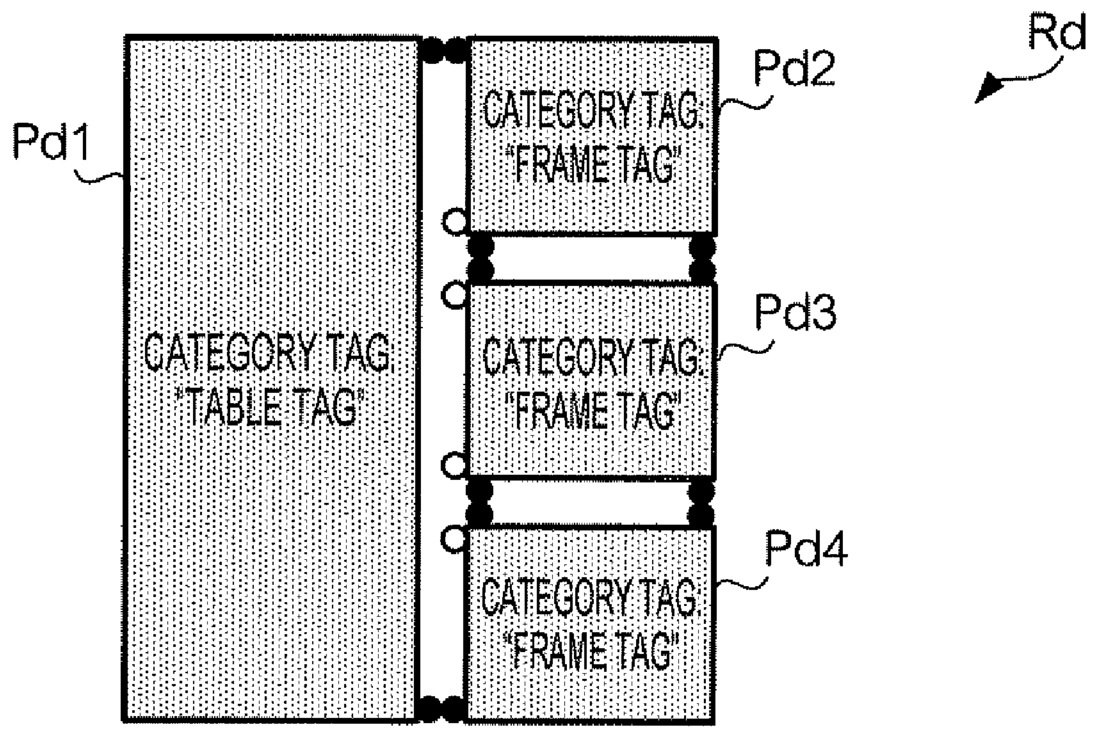
FIG. 10 is a diagram showing one example of an integrated object used in a tabular region extraction process included in the modified examples.

For example, integrated object Rd that is shown in FIG. 10 includes 1 table object Pd1 and 3 frame objects Pd2 to Pd4. As shown in the diagram, table object Pd1 and a frame object group composed of 3 frame objects Pd2 to Pd4 are positioned so as to be adjacent to each other. Within integrated object Rd, there are "4" angular links indicating the connective relationships between the horizontally adjacent objects and "8" angular links indicating the connective relationships between the vertically adjacent objects. In this case, a horizontal score of "4" points and a vertical score of "8" points are first calculated based on calculation rule 1. Moreover, within integrated object Rd, the frame object group composed of frame objects Pd2 to Pd4 is adjacent to table object Pd1 and there are "4" end points with connective relationships between frame objects Pd2 to Pd4 and table object Pd1, and therefore, based on calculation rule 2, 4 points (4×1) are added to the horizontal score. In addition, within integrated object Rd, there are 3 frame objects included in the frame object group composed of frame objects Pd2 to Pd4 and there are 2 end points of table object Pd1 indicating connective relationships between table object Pd1 and the frame object group, and therefore, based on calculation rule 3, 4 points ((3−1×2) are added to the horizontal score. Moreover, because integrated object Rd includes table object Pd1, based on calculation rule 4, α points and β points are added to the horizontal score and the vertical score, respectively.

As a result, the horizontal score and the vertical score of integrated object Rd are (12+α) points and (8+β) points, respectively.

In this case, the image processor 16 defines the number of table objects included in the integrated object as T, and when a parameter M is defined as M=i×T+(N−T), if the calculated scores satisfy each of the following formulae (4) to (6), it extracts the region of the integrated object as a tabular region. In addition, as described above, "N" is the total number of objects included in the integrated object, Sc is the horizontal score, and Sr is the vertical score. (N−T) is a number of objects other than the table objects included in the integrated object. Moreover, α and β are weighted coefficients and i is the number of frame objects included in the standard integrated object. Moreover, as described above, if M is an odd number, the remainder of the division operation (M/2) in formulae (4) and (5) is rounded off.

$$Sc+T\times\alpha\geqq 4\times(M/2) \quad (4)$$

$$Sr+T\times\beta\geqq 4\times(M/2) \quad (5)$$

$$Sc+Sr+T\times(\alpha+\beta)\geqq 4\times M \quad (6)$$

In addition, if, for example, an integrated object includes only 1 table object and 1 frame object, the region of the integrated object is directly extracted as a tabular region without performing the score calculations.

3-3. Modified Example 3

In the exemplary embodiment, if a frame object is adjacent to a table object, and if the end points on one of the mutually facing sides of the table object and the frame object have a connective relationship and the difference in length of the mutually facing sides is equal to or less than a threshold value, the image processor 16, based on cluster condition 2, clusterizes the table object and the frame object, but the conditions for clusterization are not limited to this. For example, if a frame object is adjacent to a table object, the image processor 16 may clusterize the frame object and the table object when the end points on one of the mutually facing sides of the table object and the frame object have a connective relationship and there is a ruled line of the table object at a position corresponding to the end point of the frame object.

3-4. Modified Example 4

In the exemplary embodiment, the processes performed by the image processor 16 may be implemented by a single or multiple hardware resource(s), or they may be implemented by a CPU executing a single or multiple program(s). In addition, these programs may be provided in a stored state on recording media that can be read by a computer device, including magnetic recording media such as magnetic tapes or magnetic disks, optical recording media such as optical disks, magneto-optical recording media, or semiconductor memory. Moreover, the programs may also be downloaded via communication lines such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device, comprising:

a determining unit that determines image components corresponding to linked elements from an input image;

an information-assigning unit that, if an adjacent end point on one side of a bounding rectangle of an adjacent second image component facing the side of the bounding rectangle of a first image component is, together with a target end point, within a predetermined range, assigns connection information to both the target end point and the adjacent end point, the target end point being defined as an end point on one side of a bounding rectangle of a first image component determined by the determining unit;

an integration unit that, if the connection information has been assigned to predetermined corresponding end points of both the first image component and the second image component from among the image components determined by the determining unit, integrates the adjacent image components;

a calculation unit that calculates the sum of values, the values being assigned corresponding to the connection information assigned by the information-assigning unit to each end point of the image components in an integrated image component that is composed of a plurality of image components integrated by the integration unit; and a tabular region extraction unit that, if the value calculated by the calculation unit is equal to or greater than a threshold value corresponding to the number of image components included in the integrated image component, extracts a region of the integrated image component as a tabular region.

2. The image-processing device of claim 1, wherein the determining unit determines image components of frames or tables based on quantitative characteristics of the linked elements.

3. The image-processing device of claim 2, wherein the integration unit integrates the first image component and the second image component if the connection information has been assigned to end points that are on both the side of the bounding rectangle of the first image component and the side of the bounding rectangle of the second image component facing that first side.

4. The image-processing device of claim 3, wherein when a group from among the integrated plurality of image components is adjacent to a third image component and the connection information has been assigned to the end points on both one side of a bounding rectangle of the image component group as well as one side of a bounding rectangle of the third image component facing that first side, the integration unit integrates the image component group and the third image component.

5. The image-processing device of claim 3, wherein:

the frame image component is adjacent to the table image component, and the connection information has been assigned to the end points on either one of, respectively, the sides of the bounding rectangle of the frame image component and the sides of a circumscribed rectangle of the table image component facing those first sides; and, furthermore, when the differences in length of the facing sides are equal to or less than a threshold value or there are ruled lines of the table image component at positions corresponding to the end points on the sides of the circumscribed rectangle of the frame image component, the integration unit integrates the frame image component and the table image component.

6. The image-processing device of claim 1, wherein:

the calculation unit calculates a first value as the sum of the values assigned to the end points on one side of a bounding rectangle of an image component adjacent to a first direction and on one side of a bounding rectangle of an image component facing that first side, as well as a second value as the sum of the values assigned to the end points both on the side of the bounding rectangle of the first image component that is adjacent to a second direction different from the first direction and on the side of the bounding rectangle of the second image component facing that first side; and if the first value and the second value calculated by the calculation unit for the integrated image component integrated by the integration unit are both equal to or greater than a first threshold value corresponding to the number of image components included in the integrated image component, and if the sum value of the first value and the second value is equal to or greater than a second threshold value corresponding to the number of image components included in the integrated image component, the tabular region extraction unit extracts the region of the integrated image component as the tabular region.

7. The image-processing device of claim 6, wherein if the frame image component is adjacent to the table image component within the integrated image component, the calculation unit adds a predetermined value to the values assigned to the end points on the mutually facing sides of the frame image component and the table image component.

8. The image-processing device of claim 6, wherein if a group of frame image components in which a plurality of frame image components are positioned is adjacent to a specific image component within the integrated image component, the calculation unit adds a value corresponding to the number of frame image components included in the group of frame image components to the value assigned to the end point of the specific image component on the mutually facing sides of the group of frame image components and the specific image component.

9. The image-processing device of claim 6, wherein if the table image component is included in the integrated image component, the calculation unit adds a predetermined value to both the first value and the second value.

10. The image-processing device of claim 2, comprising a deletion unit that deletes the frame image component if the frame image component is included within the table image component in the image components determined by the image component determining unit.

11. An image-reading device, comprising:

a reading unit that reads out an image of an original document; and the image-processing device of claim 1 that uses the image read by the reading unit as the input image to perform processing.

12. An image-forming device, comprising:

a reading unit that reads out an image of an original document;

the image-processing device of claim 1, wherein the image read by the reading unit is used as the input image to perform processing; and an image-forming unit that forms the image that has been processed by the image-processing device into a recording material.

13. A non-transitory computer readable medium storing a program causing a computer device to execute a process, the process comprising:

determining image components corresponding to linked elements from an input image;

assigning, if an adjacent end point on one side of a bounding rectangle of an adjacent second image component facing the side of the bounding rectangle of a first image component is, together with a target end point, within a predetermined range, connection information to both the target end point and the adjacent end point, the target end point being defined as an end point on one side of a bounding rectangle of a first image component;

integrating, if the connection information has been assigned to predetermined corresponding end points of both the first image component and the second image component from among the determined image components, the adjacent image components;

calculating the sum of values, the values being assigned corresponding to the connection information assigned to each end point of the image components in an integrated image component that is composed of a plurality of image components; and extracting, if the value calculated by the calculation unit is equal to or greater than a threshold value corresponding to the number of image components included in the integrated image component, a region of the integrated image component as a tabular region.

14. The non-transitory computer readable medium of claim 13, wherein image components of frames or tables are determined based on the quantitative characteristics of the linked elements.

15. The non-transitory computer readable medium of claim 14, wherein if the connection information has been assigned to the end points on both the side of the bounding rectangle of the first image component and the side of the bounding rectangle of the second image component facing that first side, the first image component and the second image component are integrated.

16. An image-processing method, comprising:

determining image components corresponding to linked elements from an input image;

assigning, if an adjacent end point on one side of a bounding rectangle of an adjacent second image component facing the side of the bounding rectangle of a first image component is, together with a target end point, within a predetermined range, connection information to both the target end point and the adjacent end point, the target end point being defined as an end point on one side of a bounding rectangle of a first image component;

integrating, if the connection information has been assigned to predetermined corresponding end points of both the first image component and the second image component from among the determined image components, the adjacent image components;

calculating the sum of values, the values being assigned corresponding to the connection information assigned to each end point of the image components in an integrated image component that is composed of a plurality of image components; and extracting, if the value calculated by the calculation unit is equal to or greater than a threshold value corresponding to the number of image components included in the integrated image component, a region of the integrated image component as a tabular region.

17. The image-processing method of claim 16, wherein image components of frames or tables are determined based on the quantitative characteristics of the linked elements.

18. The image-processing method of claim 17, wherein if the connection information has been assigned to the end points on both the side of the bounding rectangle of the first image component and the side of the bounding rectangle of the second image component facing that first side, the first image component and the second image component are integrated.

* * * * *